US012452601B2

(12) United States Patent
Li et al.

(10) Patent No.: US 12,452,601 B2
(45) Date of Patent: Oct. 21, 2025

(54) SPEAKER

(71) Applicant: AAC Microtech (Changzhou) Co., Ltd., Jiangsu (CN)

(72) Inventors: Ke Li, Changzhou (CN); Feng Zhang, Changzhou (CN); Zhaoyu Yin, Changzhou (CN); Daxiang Ding, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 191 days.

(21) Appl. No.: 18/522,179

(22) Filed: Nov. 28, 2023

(65) Prior Publication Data

US 2025/0106563 A1 Mar. 27, 2025

Related U.S. Application Data

(63) Continuation of application No. PCT/CN2023/121587, filed on Sep. 26, 2023.

(51) Int. Cl.

*H04R 9/02* (2006.01)
*H04R 9/04* (2006.01)
*H04R 9/06* (2006.01)

(52) U.S. Cl.

CPC ............ *H04R 9/025* (2013.01); *H04R 9/045* (2013.01); *H04R 9/06* (2013.01); *H04R 2400/11* (2013.01)

(58) Field of Classification Search

CPC .......... H04R 9/025; H04R 9/045; H04R 9/06; H04R 2400/11; H04R 2499/11
See application file for complete search history.

(56) References Cited

FOREIGN PATENT DOCUMENTS

CN 216391396 U * 4/2022 ............... H04R 9/06

* cited by examiner

*Primary Examiner* — Tuan D Nguyen
(74) *Attorney, Agent, or Firm* — Wiersch Law Group

(57) ABSTRACT

The present disclosure discloses a speaker comprising a frame, a vibration system, a magnetic circuit system, and a flexible circuit board embedded in the bottom end of the frame; the vibration system and the magnetic circuit system are respectively fixed at both ends of the frame and collectively enclosed into a sound producing cavity; the magnetic circuit system comprising a lower clamping plate and a main magnet; the lower clamping plate comprising a lower clamping body, two rectangular through-holes and two first flanges; each first flange having a shape and size matching the corresponding rectangular through-hole; each of two first flaps spaced from the main magnet and forming the magnetic gap collectively; the speaker further comprising two breathable isolators fixed to the lower clamping body and covering each of the rectangular through-holes. FPC alignment installation is convenient, cost savings; the acoustic performance of the speaker is good.

10 Claims, 7 Drawing Sheets

B-B

SPEAKER

FIELD OF THE PRESENT DISCLOSURE

The present disclosure relates to electro-acoustic transducers, especially relates to a speaker for electronic speaker products.

DESCRIPTION OF RELATED ART

With the arrival of the mobile Internet era, the number of smart mobile devices is rising. And among the many mobile devices, mobile phones are undoubtedly the most common and portable mobile terminal devices. Currently, mobile phones are extremely versatile, with high-quality music functions and vibration functions, so, speakers for having the ability to play sound are heavily used in today's smart mobile devices.

The speaker of the related art comprises a frame, and a vibration system and a magnetic circuit system respectively fixed to the frame; the magnetic circuit system comprises a lower clamping plate, a main magnet and a pole core fixed to the lower clamping plate. A vertical flange is formed by tearing and bending from the profile edge of this lower clamping plate and then forming a spacing between the flange and the main magnet and the pole core to form a magnetic gap.

However, the related art speakers due to FPC alignment and other reasons, the FPC fixed between the frame and the lower clamping plate, it will inevitably be formed after the lower clamping plate flap larger holes and can not paste the dust cover, resulting in the rear cavity of the speaker can not be closed to prevent debris, can not be used in an open rear cavity environment, while the speaker leakage can only be changed through the change of the shape of the frame and the lower clamping plate, parts of the change of the mold is time-consuming and labor-intensive, leading to the cost of too high.

Therefore, it is necessary to provide an improved speaker to overcome the problems mentioned above.

SUMMARY OF THE INVENTION

The present disclosure provides a speaker with good leakage effect, low cost and excellent acoustic performance.

The speaker comprising: a frame, a vibration system, a magnetic circuit system having a magnetic gap and driving the vibration system to vibrate and sound, and a flexible circuit board embedded in the bottom end of the frame; the vibration system and the magnetic circuit system are respectively fixed at both ends of the frame and collectively enclosed into a sound producing cavity; the vibration system includes a diaphragm fixed to the frame and a voice coil driving the diaphragm to vibrate and sound, with the voice coil inserted in the magnetic gap; the magnetic circuit system comprises a lower clamping plate and a main magnet stacked and fixed to the lower clamping plate; wherein, the lower clamping plate comprising a lower clamping body, two rectangular through-holes through the lower clamping body and respectively located on opposite sides of the main magnet, and two first flanges formed on one side of the rectangular through-holes adjacent to the main magnet and extending to the diaphragm; each first flange having a shape and size matching the corresponding rectangular through-hole; each of two first flanges spaced from the main magnet and forming the magnetic gap collectively; a portion of the lower clamping body located on the side of the rectangular through-hole away from the main magnet is square to and fixed to the frame and abuts against the flexible circuit board, and the rectangular through-hole is connected to the sound producing cavity to outside; the speaker further comprising two breathable isolators fixed to the lower clamping body and covering each of the rectangular through-holes.

Further, wherein the lower clamping plate further comprises two yielding spaces and two second flanges formed by tear bending the other opposite sides of the lower clamping body in a direction toward the vibration system, the frame being interposed within the yielding spaces, and each of the two second flanges being spaced apart from the main magnet and together forming the magnetic gap.

Further, wherein the lower clamping plate further comprises a limiting portion formed by the other opposite sides of the lower clamping body extending in the direction of toward the vibration system;

Further, a first extension portion formed by extending the opposite sides of the frame body towards the side close to the magnetic circuit system, a second extension portion formed by extending the other opposite sides of the frame body towards the side close to the magnetic circuit system, and a limit groove formed by recessing the second extension portion in a direction away from the magnetic circuit system; the first extension portion is provided on the side of the rectangular through-hole away from the magnetic circuit system, the second extension portion is provided in the yielding spaces, and the limiting portion is provided in the limit groove.

Further, wherein the lower clamping plate further comprising an inner surface adjacent to the vibration system and an outer surface disposed opposite the inner surface, the lower clamping plate being provided with a groove formed by recessing the outer surface towards the inner surface from the outer surface, the rectangular through-hole being disposed within the groove, the breathable isolator being housed in the groove and covering the rectangular through-hole.

Further, wherein the lower clamping plate further comprising two tabs formed by the outer peripheral edges of opposite sides of the lower clamping body extending in the vibratory direction; the two tabs being located on the side of each of the two rectangular through-holes away from the main magnet; the two tabs being fixed to the frame.

Further, wherein the flexible circuit board includes a flexible conductive member fixed to the frame and a connection portion formed by a side of the flexible conductive member extending away from the main magnet, the flexible conductive member being electrically connected to the voice coil.

Further, wherein the diaphragm comprising a folded ring in shape of an annulus and a vibrating section in the shape of an annulus and fixed to an inner periphery of the folded ring, an outer periphery of the folded ring being fixed to the frame, the voice coil being fixed to the side of the vibrating section near the magnetic circuit system.

Further, wherein the vibration system further comprising an auxiliary dome fixed to a side of the vibration section proximate to the magnetic circuit system, the voice coil fixed to a side of the auxiliary dome proximate to the magnetic circuit system.

Further, wherein the magnetic circuit system further comprising a pole core superimposed and fixed to the main magnet.

Further, wherein the speaker further comprises a cover plate fixed to the frame, a sound outlet hole through the cover plate and a dust cover fixed to the cover plate and covering the sound outlet hole.

Compared to related arts, the speaker of the present disclosure comprising a frame, a vibration system, a magnetic circuit system having a magnetic gap and driving the vibration system to vibrate and sound, and a flexible circuit board embedded in the bottom end of the frame; the vibration system and the magnetic circuit system are respectively fixed at both ends of the frame and collectively enclosed into a sound producing cavity; the lower clamping plate in the magnetic circuit system comprising a lower clamping body, two rectangular through-holes through the lower clamping body and respectively located on opposite sides of the main magnet, and two first flanges formed on one side of the rectangular through-holes adjacent to the main magnet and extending to the diaphragm; each first flange having a shape and size matching the corresponding rectangular through-hole; each of two first flanges spaced from the main magnet and forming the magnetic gap collectively; a portion of the lower clamping body located on the side of the rectangular through-hole away from the main magnet is square to and fixed to the frame and abuts against the flexible circuit board, and the rectangular through-hole is connected to the sound producing cavity to outside; the speaker further comprising two breathable isolators fixed to the lower clamping body and covering each of the rectangular through-holes. Through the rectangular through-hole setup to facilitate the flexible circuit board FPC alignment position is covered to the lower clamping plate, FPC alignment installation is convenient, cost savings; at the same time, the two breathable isolators are fixed to the lower clamping body and cover the two rectangular through-holes, effectively change the damping of the breathable isolators and precise adjustment and control, so that it is more convenient and quick to adjust the acoustic performance of the speakers.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
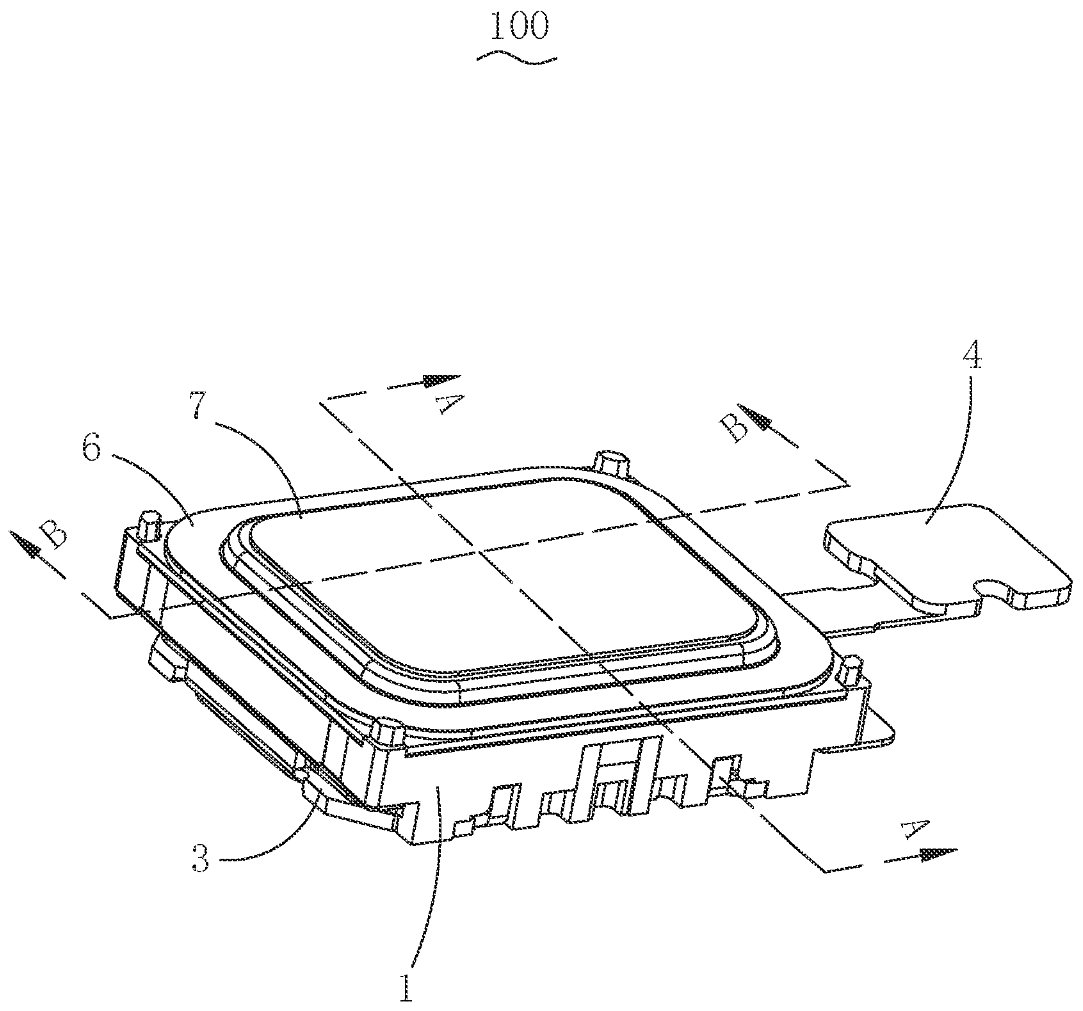
FIG. 1 is a structure schematic of a speaker of the present disclosure.
Figure 2:
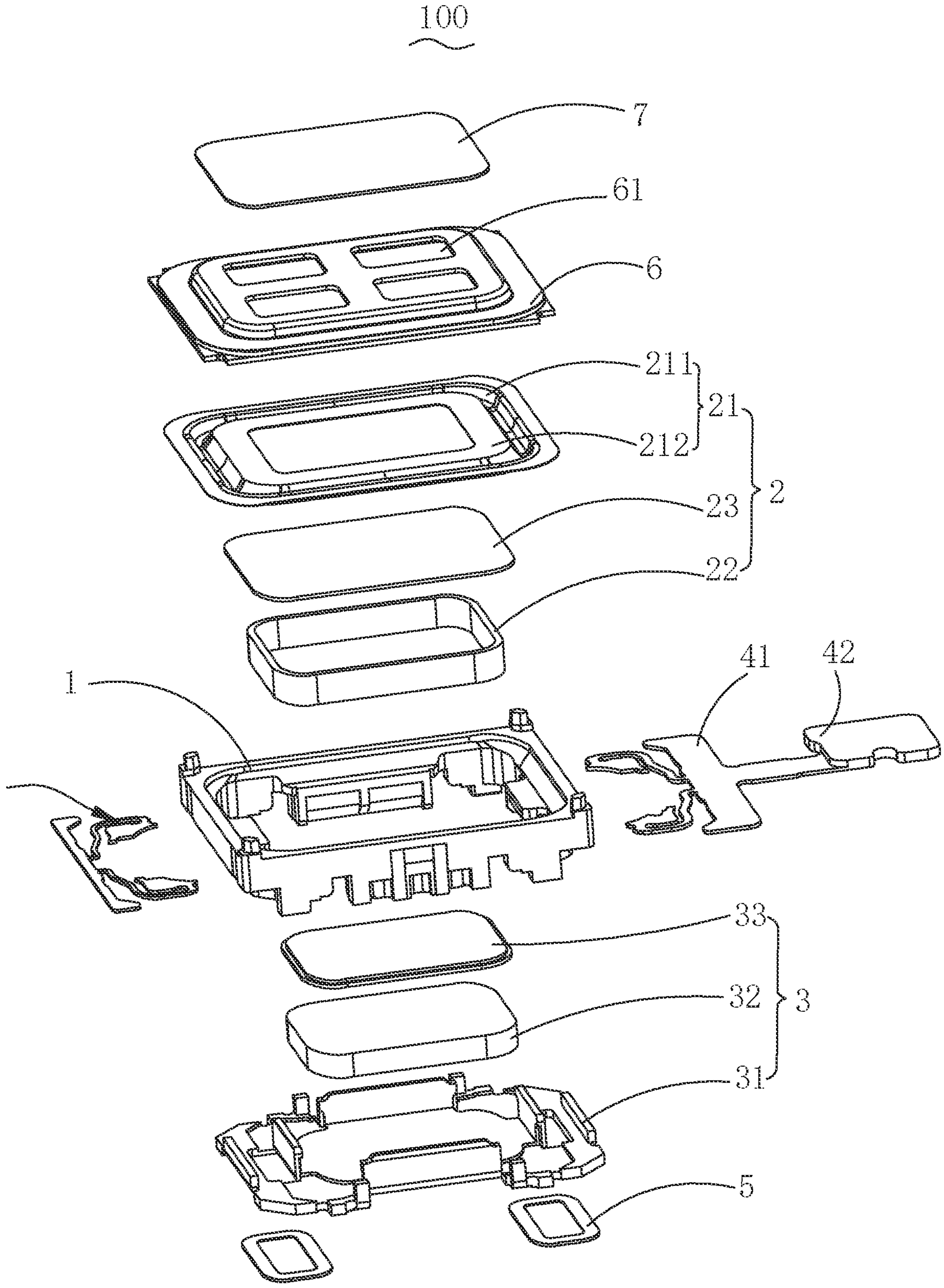
FIG. 2 is an exploded view of the speaker of the present disclosure.
Figure 3:
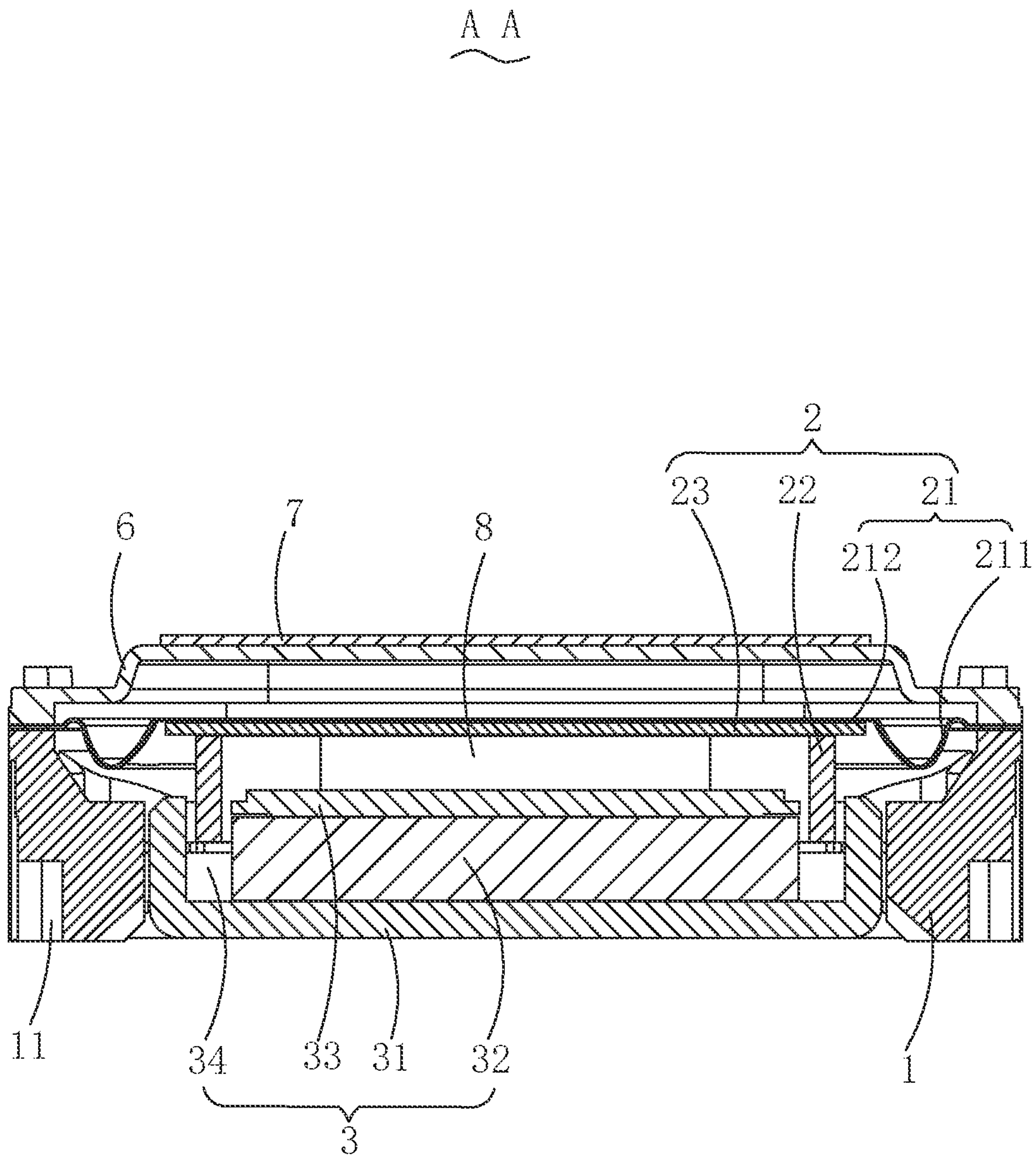
FIG. 3 is a cross-sectional view of the speaker taken along line A-A in FIG. 1.
Figure 4:
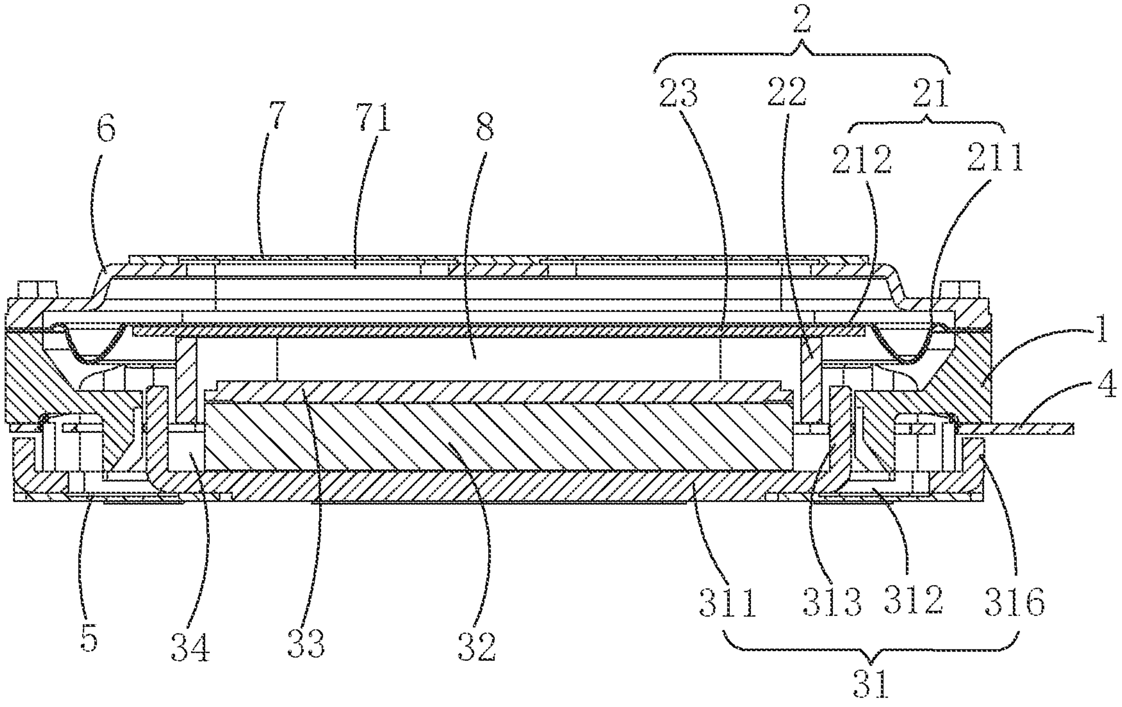
FIG. 4 is a cross-sectional view of the speaker taken along line B-B in FIG. 1.
Figure 5:
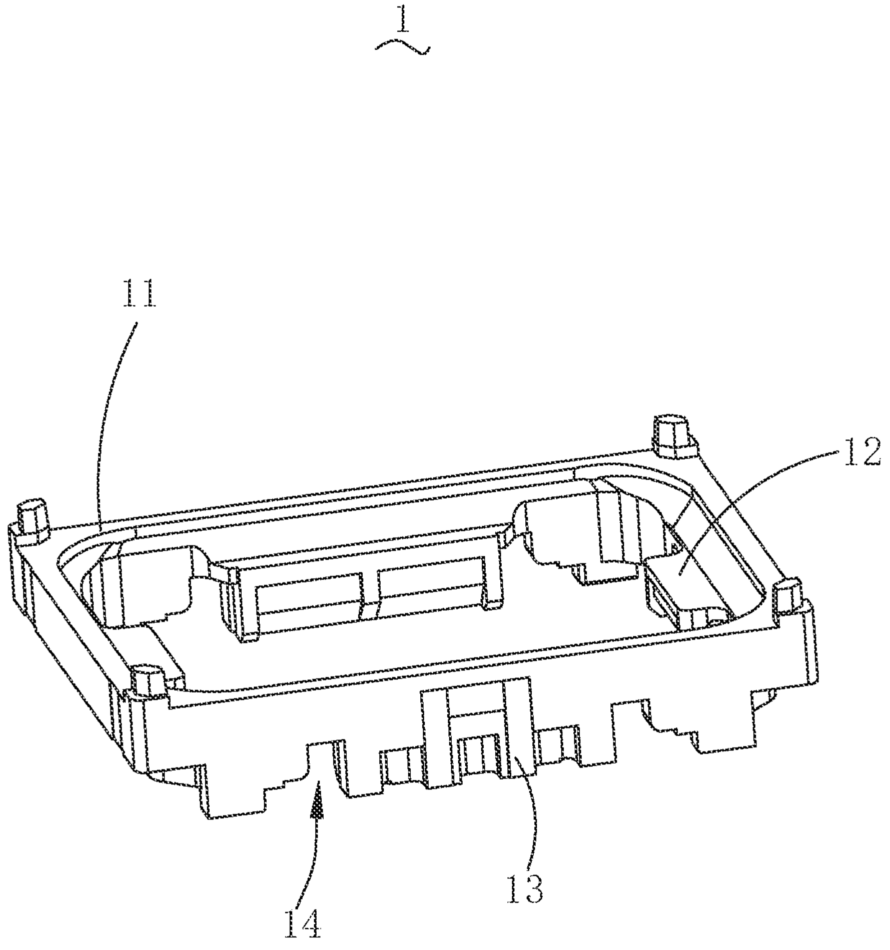
FIG. 5 is a structure schematic of a frame of the present disclosure.
Figure 6:
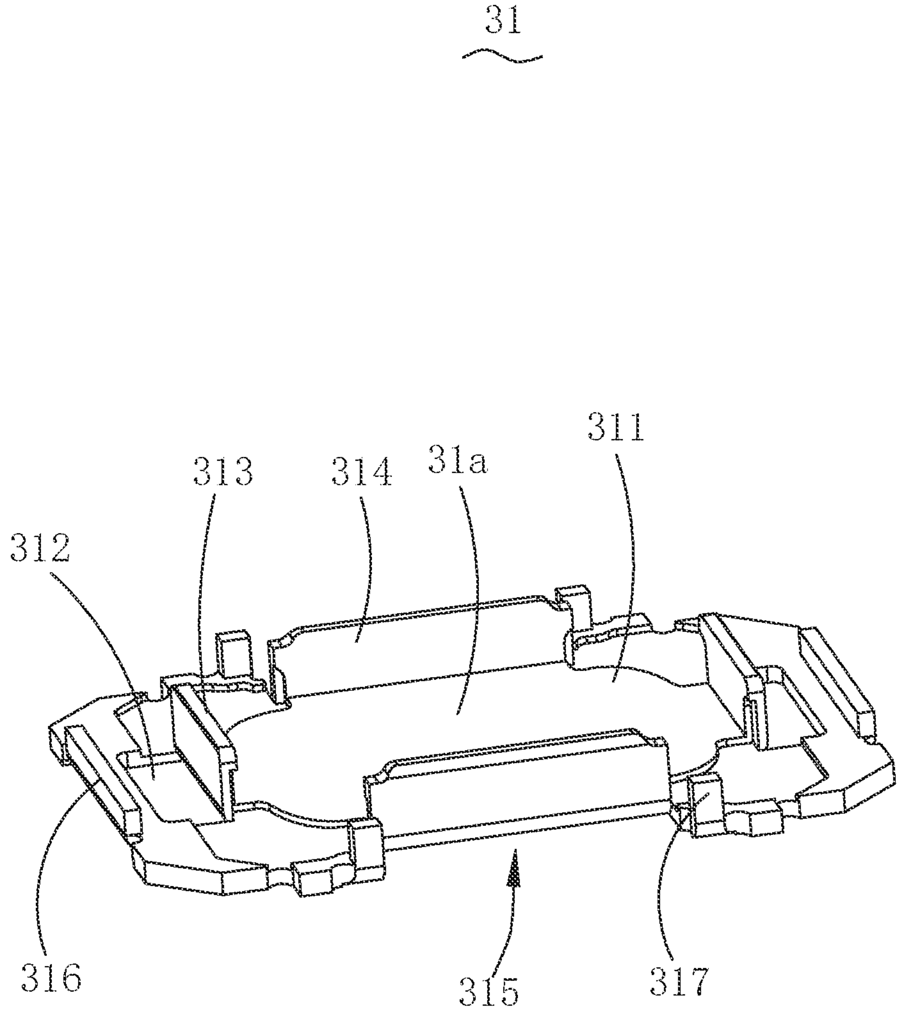
FIG. 6 is a structure schematic of a lower clamping plate of the present disclosure.
Figure 7:
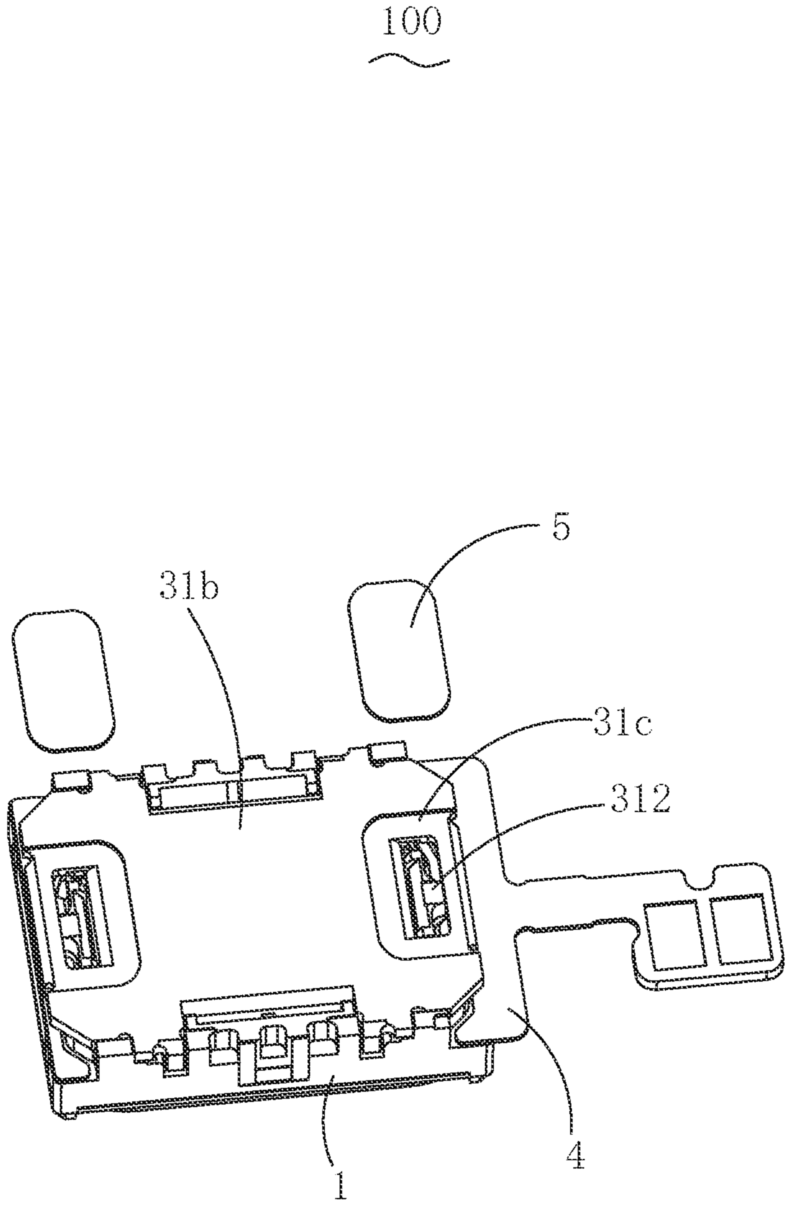
FIG. 7 is an exploded view of a bottom surface of the speaker of the present disclosure.

Please refer to FIGS. 1-7 together, the present disclosure providing a speaker 100 comprising: a frame 1, a vibration system 2, a magnetic circuit system 3 having a magnetic gap 34 and driving the vibration system 2 to vibrate and sound, and a flexible circuit board 4 embedded in the bottom end of the frame 1; the vibration system 2 and the magnetic circuit system 3 are respectively fixed at both ends of the frame 1 and collectively enclosed into a sound producing cavity 8.

The vibration system 2 includes a diaphragm 21 fixed to the frame 2 and a voice coil 22 driving the diaphragm 21 to vibrate and sound, with the voice coil 22 inserted in the magnetic gap 34.

The magnetic circuit system 3 comprises a lower clamping plate 31 and a main magnet 32 stacked and fixed to the lower clamping plate 31.

In this embodiment, the magnetic circuit system 3 further comprises pole core 33 superimposed and fixed to the main magnet 32. The lower clamping plate 31 is used to support and fix the main magnet 32, and pole core 33 are stacked and fixed to the main magnet 32 for increasing the magnetic force of the main magnet 32.

The lower clamping plate 31 comprising a lower clamping body 311, two rectangular through-holes 312 through the lower clamping body 311 and respectively located on opposite sides of the main magnet 32, and two first flanges 313 formed on one side of the rectangular through-holes 312 adjacent to the main magnet 32 and extending to the diaphragm 21; each first flange 313 having a shape and size matching the corresponding rectangular through-hole 312; each of two first flanges 313 spaced from the main magnet 32 and forming the magnetic gap 34 collectively; a portion of the lower clamping body 311 located on the side of the rectangular through-hole 312 away from the main magnet 32 is square to and fixed to the frame 1 and abuts against the flexible circuit board 4, and the rectangular through-hole 312 is connected to the sound producing cavity 8 to outside.

More preferably, the two rectangular through-holes 312 and the two first flanges 313 are formed by tear bending opposite sides of the lower clamping body 311 in the direction of toward the vibration system 2. Wherein the first flanges 313 are formed by bending a portion of the lower clamping body 311 that corresponds to a range of the rectangular through-holes 312, and the first flanges 313 can just fill the rectangular through-holes 312. The flexible circuit board 4 is located on the side of the rectangular through-hole 312 close to the vibration system 2. First flanges 313 is formed by tear bending on opposite sides (on both sides of the short axis) of the lower clamp body 311 so that the first flanges 313 are formed by bending the lower clamping body 311 in the direction of toward the vibration system 2. Of course, since the first flange 313 is formed by tearing a portion of the lower clamping body 311, which results in the lower clamping body 311 forming the rectangular through-hole 312, it is easy to manufacture and saves cost. The provision of the rectangular through-hole 312 facilitates the FPC alignment position of the flexible circuit board 4 to be covered to the lower clamping plate 31, and the FPC alignment is easy to install.

More specifically, a portion of the lower clamping body 311 located on the side of the rectangular through-hole 312 away from the main magnet 32 is square to and fixed to the frame 1. The portion that facilitates the mounting of the FPC in the opening on the pot holder 1 is covered, allowing the FPC alignment to give way and saving installation space.

The speaker 100 further comprising two breathable isolators 5 fixed to the lower clamping body 311 and covering each of the rectangular through-holes 312. The damping of the breathable isolators 5 is effectively changed and precisely adjusted and controlled, so that the acoustic performance of the speaker 100 can be adjusted more easily and quickly.

The lower clamping plate 31 further comprises two yielding spaces 315 and two second flanges 314 formed by tear bending the other opposite sides of the lower clamping body 311 in a direction toward the vibration system, the frame 1 being interposed within the yielding spaces 315, and each of the two second flanges 314 being spaced apart from the main magnet 32 and together forming the magnetic gap 34. Two second flanges 314 are formed on either side of the long axis of the lower clamping body 311 to form a magnetic gap 34 by spacing the two second flanges 314 and the two first flanges 313, respectively, from the main magnet 32. At the same time, the first flange 313 and the second flange 314 can also provide side limitations to the main magnet 32, and the fixing effect is better. The yielding space 315 facilitates the installation of the frame 1, saves the space of the overall speaker 100, and saves costs.

The lower clamping plate 31 further comprises a limiting portion 317 formed by the other opposite sides of the lower clamping body 311 extending in the direction of toward the vibration system 2.

the frame 1 comprises a frame body 11, a first extension portion 12 formed by extending the opposite sides of the frame body 11 towards the side close to the magnetic circuit system 3, a second extension portion 13 formed by extending the other opposite sides of the frame body 11 towards the side close to the magnetic circuit system 3, and a limit groove 14 formed by recessing the second extension portion 13 in a direction away from the magnetic circuit system 3; the first extension portion 12 is provided on the side of the rectangular through-hole 312 away from the magnetic circuit system 3, the second extension portion 13 is provided in the yielding spaces 315, and the limiting portion 317 is provided in the limit groove 14. Enables easy assembly and good fixation between the frame 1 and the lower clamping plate 31.

The lower clamping plate 31 further comprising an inner surface 31*a* adjacent to the vibration system 2 and an outer surface 31*b* disposed opposite the inner surface 31*a*, the lower clamping plate 31 being provided with a groove 31*c* formed by recessing the outer surface 31*b* towards the inner surface 31*a* from the outer surface 31*b*, the rectangular through-hole 312 being disposed within the groove 31*c*, the breathable isolator 5 being housed in the groove 31*c* and covering the rectangular through-hole 312. So that the breathable isolator 5 is affixed to the groove 31*c*, the lower surface of the breathable isolator 5 is parallel to the outer surface 31*b* of the lower clamping plate 31, avoiding the breathable isolator 5 from protruding out of the outer surface 31*b* of the lower clamping plate 31, with a good fixing effect and aesthetically pleasing.

In the embodiment, the lower clamping plate 31 further comprising two tabs 316 formed by the outer peripheral edges of opposite sides of the lower clamping body 311 extending in the vibratory direction; the two tabs 316 being located on the side of each of the two rectangular through-holes 312 away from the main magnet 32; the two tabs 316 being fixed to the frame 1. By cooperating with the first extension portion 12 of the frame 1 through the tab 316 and the first flange 313, the first extension portion 12 is arranged between the tab 316 and the first flange 313. Measures such as pasting a breathable isolator 5 on the rectangular through-hole 312 are taken to achieve the airtightness of the speaker 100, which is used to prevent debris, so that the speaker 100 can be used in the environment of the rear cavity opening.

In the embodiment, the flexible circuit board 4 includes a flexible conductive member 41 fixed to the frame 1 and a connection portion 42 formed by a side of the flexible conductive member 41 extending away from the main magnet 32, the flexible conductive member 41 being electrically connected to the voice coil 22. An external power supply is connected via the connection portion 42 and transmitted to the voice coil 22 via the flexible conductive member 41 to power the voice coil 22, thereby causing the voice coil 22 to drive the diaphragm 21 to vibrate to produce sound.

More preferably, the flexible conductive member 41 is made of FPC (Flexible Printed Circuit), which has good elastic properties and facilitates conducting electricity for the voice coil 22.

In the embodiment, the diaphragm 21 comprising a folded ring 211 in shape of an annulus and a vibrating section 212 in the shape of an annulus and fixed to an inner periphery of the folded ring 211, an outer periphery of the folded ring 211 being fixed to the frame 1, the voice coil 22 being fixed to the side of the vibrating section 212 near the magnetic circuit system 3.

In the embodiment, the vibration system 2 further comprising an auxiliary dome 23 fixed to a side of the vibration section 212 proximate to the magnetic circuit system 3, the voice coil 22 fixed to a side of the auxiliary dome 23 proximate to the magnetic circuit system 3. The voice coil 22 fixed to a side of the auxiliary dome 23 proximate to the magnetic circuit system 3, the provision of the auxiliary dome 23 allows more insertion of the voice coil 22 into the magnetic gap 34, improving the vibratory performance of the diaphragm 21.

In the embodiment, the speaker 100 further comprises a cover plate 6 fixed to the frame 1, a sound outlet hole 61 through the cover plate 6 and a dust cover 7 fixed to the cover plate 6 and covering the sound outlet hole 61. The sound emitted by the voice coil 22 driving the vibration of the diaphragm 21 is transmitted through the sound outlet hole 61, and the acoustic performance of the speaker 100 is good. The dust cover 7 is capable of protecting the diaphragm 21 from dust.

Optionally, the sound outlet holes 61 are four, evenly spaced apart in the cover plate 6.

More preferably, the sound outlet hole 61 is a rectangular structure. The rectangular structure is easy to manufacture and saves cost.

Compared to related arts, the speaker of the present disclosure comprising a frame, a vibration system, a magnetic circuit system having a magnetic gap and driving the vibration system to vibrate and sound, and a flexible circuit board embedded in the bottom end of the frame; the vibration system and the magnetic circuit system are respectively fixed at both ends of the frame and collectively enclosed into a sound producing cavity; the lower clamping plate in the magnetic circuit system comprising a lower clamping body, two rectangular through-holes through the lower clamping body and respectively located on opposite sides of the main magnet, and two first flanges formed on one side of the rectangular through-holes adjacent to the main magnet and extending to the diaphragm; each first flange having a shape and size matching the corresponding rectangular through-hole; each of two first flanges spaced from the main magnet and forming the magnetic gap collectively; a portion of the lower clamping body located on the side of the rectangular through-hole away from the main magnet is square to and fixed to the frame and abuts against the flexible circuit board, and the rectangular through-hole is connected to the sound producing cavity to outside; the speaker further comprising two breathable isolators fixed to the lower clamping body and covering each of the rectangular through-holes. Through the rectangular through-hole setup to facilitate the flexible circuit board FPC alignment position is covered to the lower clamping plate, FPC alignment installation is convenient, cost savings; at the same time, the two breathable isolators are fixed to the lower clamping body and cover the two rectangular through-holes, effectively change the damping of the breathable isolators and precise adjustment and control, so that it is more convenient and quick to adjust the acoustic performance of the speakers.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker comprising: a frame, a vibration system, a magnetic circuit system having a magnetic gap and driving the vibration system to vibrate and sound, and a flexible circuit board embedded in the bottom end of the frame; the vibration system and the magnetic circuit system are respectively fixed at both ends of the frame and collectively enclosed into a sound producing cavity;

the vibration system includes a diaphragm fixed to the frame and a voice coil driving the diaphragm to vibrate and sound, with the voice coil inserted in the magnetic gap;

the magnetic circuit system comprises a lower clamping plate and a main magnet stacked and fixed to the lower clamping plate;

wherein, the lower clamping plate comprising a lower clamping body, two rectangular through-holes through the lower clamping body and respectively located on opposite sides of the main magnet, and two first flanges formed on one side of the rectangular through-holes adjacent to the main magnet and extending to the diaphragm; each first flange having a shape and size matching the corresponding rectangular through-hole; each of two first flanges spaced from the main magnet and forming the magnetic gap collectively; a portion of the lower clamping body located on the side of the rectangular through-hole away from the main magnet is square to and fixed to the frame and abuts against the flexible circuit board, and the rectangular through-hole is connected to the sound producing cavity to outside;

the speaker further comprising two breathable isolators fixed to the lower clamping body and covering each of the rectangular through-holes.

2. The speaker as described in claim 1, wherein the lower clamping plate further comprises two yielding spaces and two second flanges formed by tear bending the other opposite sides of the lower clamping body in a direction toward the vibration system, the frame being interposed within the yielding spaces, and each of the two second flanges being spaced apart from the main magnet and together forming the magnetic gap.

3. The speaker as described in claim 2, wherein the lower clamping plate further comprises a limiting portion formed by the other opposite sides of the lower clamping body extending in the direction of toward the vibration system;

the frame comprises a frame body, a first extension portion formed by extending the opposite sides of the frame body towards the side close to the magnetic circuit system, a second extension portion formed by extending the other opposite sides of the frame body towards the side close to the magnetic circuit system, and a limit groove formed by recessing the second extension portion in a direction away from the magnetic circuit system; the first extension portion is provided on the side of the rectangular through-hole away from the magnetic circuit system, the second extension portion is provided in the yielding spaces, and the limiting portion is provided in the limit groove.

4. The speaker as described in claim 1, wherein the lower clamping plate further comprising an inner surface adjacent to the vibration system and an outer surface disposed opposite the inner surface, the lower clamping plate being provided with a groove formed by recessing the outer surface towards the inner surface from the outer surface, the rectangular through-hole being disposed within the groove, the breathable isolator being housed in the groove and covering the rectangular through-hole.

5. The speaker as described in claim 1, wherein the lower clamping plate further comprising two tabs formed by the outer peripheral edges of opposite sides of the lower clamping body extending in the vibratory direction; the two tabs being located on the side of each of the two rectangular through-holes away from the main magnet; the two tabs being fixed to the frame.

6. The speaker as described in claim 1, wherein the flexible circuit board includes a flexible conductive member fixed to the frame and a connection portion formed by a side of the flexible conductive member extending away from the main magnet, the flexible conductive member being electrically connected to the voice coil.

7. The speaker as described in claim 1, wherein the diaphragm comprising a folded ring in shape of an annulus and a vibrating section in the shape of an annulus and fixed to an inner periphery of the folded ring, an outer periphery of the folded ring being fixed to the frame, the voice coil being fixed to the side of the vibrating section near the magnetic circuit system.

8. The speaker as described in claim 7, wherein the vibration system further comprising an auxiliary dome fixed to a side of the vibration section proximate to the magnetic circuit system, the voice coil fixed to a side of the auxiliary dome proximate to the magnetic circuit system.

9. The speaker as described in claim 1, wherein the magnetic circuit system further comprising a pole core superimposed and fixed to the main magnet.

10. The speaker as described in claim 1, wherein the speaker further comprises a cover plate fixed to the frame, a sound outlet hole through the cover plate and a dust cover fixed to the cover plate and covering the sound outlet hole.

* * * * *